US007126955B2

(12) United States Patent
Nabhan et al.

(10) Patent No.: US 7,126,955 B2
(45) Date of Patent: Oct. 24, 2006

(54) ARCHITECTURE FOR EFFICIENT UTILIZATION AND OPTIMUM PERFORMANCE OF A NETWORK

(75) Inventors: Tarek Nabhan, Cairo (EG); Youssri Helmy, Lexington, MA (US)

(73) Assignee: F5 Networks, Inc., Seattle, WA (US)

( * ) Notice: Subject to any disclaimer, the term of this patent is extended or adjusted under 35 U.S.C. 154(b) by 113 days.

(21) Appl. No.: 10/354,438

(22) Filed: Jan. 29, 2003

(65) Prior Publication Data

US 2004/0146053 A1 Jul. 29, 2004

(51) Int. Cl.
*H04L 12/56* (2006.01)
(52) U.S. Cl. ...................... 370/401; 370/473
(58) Field of Classification Search ........... 370/389, 370/392, 393, 401, 465, 466, 469, 471; 709/247
See application file for complete search history.

(56) References Cited

U.S. PATENT DOCUMENTS

| 5,657,452 | A | * | 8/1997 | Kralowetz et al. ........... 709/227 |
| 5,768,525 | A | | 6/1998 | Kralowetz et al. |
| 5,945,933 | A | | 8/1999 | Kalkstein |
| 6,012,062 | A | * | 1/2000 | Jagadish et al. ............. 707/101 |
| 6,115,384 | A | * | 9/2000 | Parzych ....................... 370/401 |
| 6,304,567 | B1 | * | 10/2001 | Rosenberg ................... 370/356 |
| 6,314,095 | B1 | * | 11/2001 | Loa .............................. 370/352 |
| 6,397,259 | B1 | | 5/2002 | Lincke et al. |
| 6,449,658 | B1 | | 9/2002 | Lafe et al. |
| 6,658,463 | B1 | | 12/2003 | Dillon et al. |
| 2002/0071438 | A1 | | 6/2002 | Singh |
| 2002/0136224 | A1 | | 9/2002 | Motley |
| 2003/0177396 | A1 | | 9/2003 | Bartlett et al. |
| 2004/0015591 | A1 | | 1/2004 | Wang |

2004/0103225 A1 5/2004 McAlpine et al.

FOREIGN PATENT DOCUMENTS

| WO | WO 01/37516 | 5/2001 |
| WO | WO 01/37516 A2 | 5/2001 |

OTHER PUBLICATIONS

Huffman, David A., "A Method for the Construction of Minimum-Redundancy Codes," *Proceedings of the I.R.E.*, 40:1098-1101 (1952).
Ziv, Jacob, et al., "A Universal Aloirthm for Sequential Data Compression," *IEEE Transactions on Information Theory*, IT23(3):337-343 (1977).
Huffman, David A. (1952) "A Method for the Construction of Minimum-Redundancy Codes," *Proceedings of the I.R.E.*, 40:1098-1101.
Ziv, J. et al. (1977) "A Universal Algorithm for Sequential Data Compression," *IEEE Transactions on Information Theory*, IT23(3):337-343.

* cited by examiner

*Primary Examiner*—Doris H. To
*Assistant Examiner*—Soon D. Hyun
(74) *Attorney, Agent, or Firm*—Darby & Darby PC; John W. Branch

(57) ABSTRACT

An architecture for optimizing network communications that utilizes a device positioned at two edges of a constrained Wide Area Network (WAN) link. The device intercepts outgoing network packets and reroutes them to a proxy application. The proxy application uses persistent connections with a network accelerator device at the other end of the persistent connection. The proxy applications transmit the intercepted data after compressing it using a dictionary-based compression algorithm. Packet mangling may involve spoofing the connection request at each end node; a proxy-to-proxy communication protocol specifies a way to forward an original address, port, and original transport protocol information end to end. The packet mangling and proxy-to-proxy communication protocol assure network transparency.

32 Claims, 4 Drawing Sheets

ARCHITECTURE FOR EFFICIENT UTILIZATION AND OPTIMUM PERFORMANCE OF A NETWORK

BACKGROUND OF THE INVENTION

The present invention relates to increasing performance of Wide Area Network (WAN) communications and in particular to a device positioned at both ends of a constrained link that reroutes outgoing packets to a proxy application that implements data compression.

The growth in data communication traffic, including email, client/server applications, multimedia applications, Internet and intranet applications, has continued to cause critical bandwidth shortages across many networks. This demand for instant data communication often exceeds the amount of bandwidth available, resulting in congestion and delay. As more applications move from Local Area Networks (LANs) to Wide Area Networks (WANs) application performance and response time issues become critical to continued smooth operation of an enterprise. With offices widely distributed around the globe and present day budgetary constraints, the implementation of additional wide area links is cost prohibitive for many international installations. Consequently, application and network architects need additional solutions to help them efficiently use existing bandwidth to support more applications and more end users.

The Open Systems Interconnection (OSI) reference model is a widely used model describing the flow of data traffic across a network. The OSI model has seven layers; each of the seven layers communicates with a layer below it through a specific interface and its peer layer on a different system in the network through a specific protocol. The combination of all networking protocol layers is often referred to as the networking stack. Packet based Transmission Control Protocol over Internet Protocol (TCP/IP) is perhaps the most widely known protocol in use in the Internet. IP is a network layer (Layer 3) protocol that defines a set of standards for addressing and routing of packets across a connectionless network. TCP is a connection oriented, transport layer (Layer 4) protocol that defines a way to ensure reliable transport of information.

Encoding or compression of network communication data is a natural choice for reducing the amount of traffic needed to be carried over a network link. Different schemes have been previously proposed for reducing traffic via compression. Most of these implementations concentrate on compressing traffic at the IP layer (Layer 3) of the OSI model. These Layer 3 encoding techniques are typically based on intra-packet and/or inter-packet compression schemes that have been described in the prior art. The aim of these schemes is to reduce the number of bytes transmitted in every packet; thus, these systems encode each packet or datagram independently, based upon information within each packet. Since they are not capable of detecting repetition of entire packets or repetitions that exist across multiple packets, they typically may miss many possible repetitions and therefore do not yield a high degree of reduction.

It is also well known to compress data at a much higher layer of the communications networking stack, such as at the application layer (Layer 7). For instance, images can be compressed in a variety of formats such as the Graphics Interchange Format (.gif) or the Joint Photographic Experts Group format (.jpeg). These data file-encoding formats reduce the space required for storage for such an image as well as its transmission. Hence, at the application layer a server may encode all of its images in the (.gif) format before transmission to a client on the other end of a WAN connection. Each image received by the client would then be decoded at the application layer to generate the original viewable image.

However, this form of application layer encoding and/or compression is typically performed offline, on single objects, prior to transmission. Such application layer encoding is not performed in an online fashion within a continuous communications stream. These types of encoding schemes are thus largely based only on intra-object information, that is, information contained in a single image, rather than inter-object information that consider data from all of the different objects to be transmitted from one or more servers to one or more clients.

For example, International Patent Publication Number WO 01/37516 describes a technique whereby a private network connection is implemented between devices known as accelerator exchange servers. A corresponding accelerator exchange client software is installed at a client's. The accelerator exchange client software may be implemented as a browser program adds on, for example.

U.S. Pat. No. 5,657,452 also discloses a method for setting up a connection over a data network. A proxy engine is used to implement data compression. However, this approach requires installation of the proxy engine so that it runs in a local endpoint node application.

SUMMARY OF THE INVENTION

The present invention provides an architecture for a network optimization computing device that provides bandwidth saving and performance boosting over constrained Wide Area Network (WAN) links. The network acceleration device is positioned at each one of at least two edges of a constrained WAN link. The device intercepts outgoing Internet Protocol (IP) packets, rerouting them to a proxy application on the same device. The proxy application uses a persistent connection with a proxy application located within a corresponding network accelerator device at the other end of the WAN link. The persistent connection is used to transmit the intercepted data after compressing it using a dictionary-based compression algorithm. The device uses techniques such as address spoofing and a proxy-to-proxy communication protocol to assure network transparency from the perspective of the client matrices, so that they do not have to install or run any special application software.

In another aspect, the present invention relates to the ability to intercept network traffic at a connection layer, and route it to a private, constrained WAN link. Rerouting of messages is done in a way in which it is transparent to the end nodes. That is, no specialized browser program and/or application software needs to be installed at the end user client computers. These devices only view a standard virtual connection; no modification is needed to their standard protocol layer processing. Responsibility for intercepting LAN TCP connection request packets and completing the proxy connections is entirely the function of the network accelerator devices.

This architecture provides a number of benefits for network optimization as compared to traditional packet based compression schemes.

To begin with, most other approaches concentrate on reducing the number of bytes each particular packet has. The approach of the present invention actually reduces the number of packets. This is because compression occurs at a higher layer than the TCP/IP layer, and the compressed stream is divided at inter-packets at the TCP layer. This technique thus results in a smaller number of "fat" or full packets to be transmitted over the LAN link, rather than a large number of "thin" or small packets.

In addition, data is transferred over the WAN link via a persistent connection. Thus, connection and termination requests packets are not repeatedly transmitted over the WAN link.

By reducing the overall number of packets network utilization is actually increased. This reduces the need for packet retransmissions due to errors, in turn reducing the load on routers in the WAN. As a result, a significant boost in the performance of applications running over the WAN is realized.

An architecture according to the present invention also offers higher bandwidth saving over traditional packet based compressions schemes. There are a number of reasons for this.

Since the architecture results in a significant reduction in the number of packets, sophisticated compression algorithms can be used with essentially no effect on the overall performance. Packet-based compression schemes are typically quite sensitive to the complexity of the compression algorithms employed, and tend to use relatively easy to implement and simple compression schemes. However, the significant packet reduction available with the present invention justifies using complex compression schemes, since the gain more than compensates for the extra processing time.

The invention may also use the same dictionary to compress all streams of data belonging to a given connection. Typically, different streams of the same connection will have a common context. In this instance, therefore, the dictionary will be relevant.

Finally, the invention employs a persistent dictionary for every persistent connection. Thus, all connections relevant to a particular type may have a common context. The dictionary thus becomes more or less like a cache for particular traffic types. For example, emails originating from a particular site may have the same fixed header or a trailer containing a confidentially notice. When these emails are sent from different client computers but all originating from the same end of a WAN connection, they will have many words in common. The application of a persistent common dictionary to the persistent connection between the two ends of the WAN link therefore results in efficient compression for the traffic, which is repeatedly sent between the two ends, regardless of the client computer from which it originates.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

To achieve the desired performance improvement the present invention employs a network accelerator device (NET ACCEL) 14 at each end of a constrained Wide Area Network (WAN) connection. In the example in FIG. 1, improved communication is to be provided between a first or Local Area Network (LAN) 11-1 and a second LAN 11-2. The respective LANs 11 each consist of a number of client computing devices located at network end nodes such as devices 10-1-1, 10-1-2, . . . 10-1-$m$ that comprise the first LAN 11-1, and similar client devices located at nodes 10-2-1, 10-2-2, . . . 10-2-$n$ located within the second LAN 11-2. It is important to note that the devices herein referred to as the "clients" 10 are unaware that their traffic is being communicated via the network accelerators 14-1 and 14-2. Traffic passing through the network accelerators 14 is compressed in a way in which is transparent to the end nodes 10 while achieving the required bandwidth reduction. The manner of implementing this will be described in detail shortly.

In general, clients 10-1 associated with first LAN 11-1 connect one or more switches 12-1 to the network accelerator 14-1 to a router 16-1. Router 16-1 has available connections to the second LAN 11-2 through a private WAN 20 that may, for example, be Internet Protocol (IP) based. The second LAN 11-2 similarly consists of a router 16-2, network accelerator, 14-2 switches 12-2 and associated clients or nodes 10-2.

Figure 2:
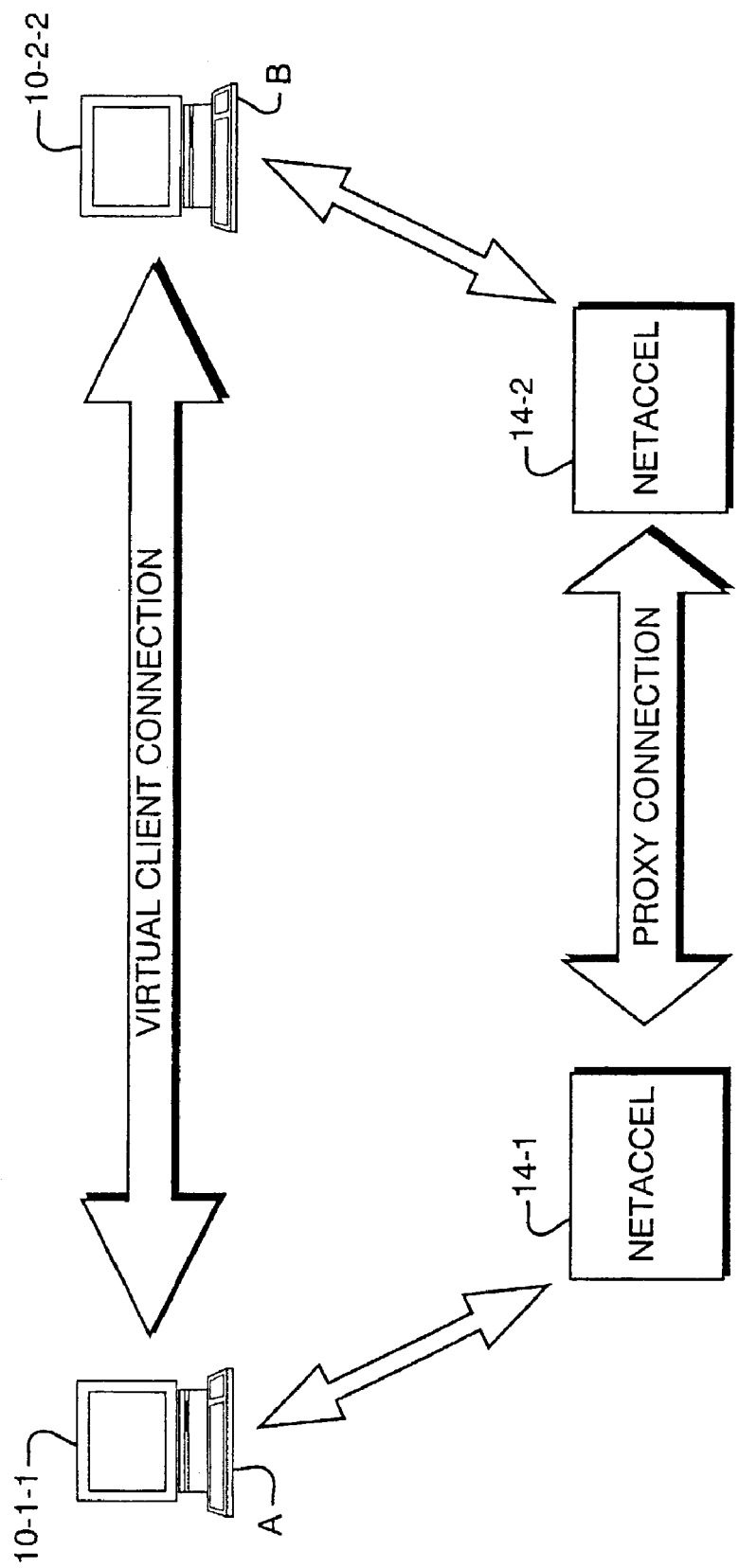
FIG. 2 is a high-level block diagram illustrating how a network transparency is achieved through the proxy connection.

The network accelerators 14-1 and 14-2 provide a proxy server for connections established between the respective LANs 11 that they serve. Thus, as shown in FIG. 2, from the perspective of client 10-1-1 and 10-2-2, they have directly established a connection in the usual way and the existence of the proxy connection is entirely transparent to them. The implementation of such a proxy is done with known address spoofing techniques to assure transparency.

Figure 1:
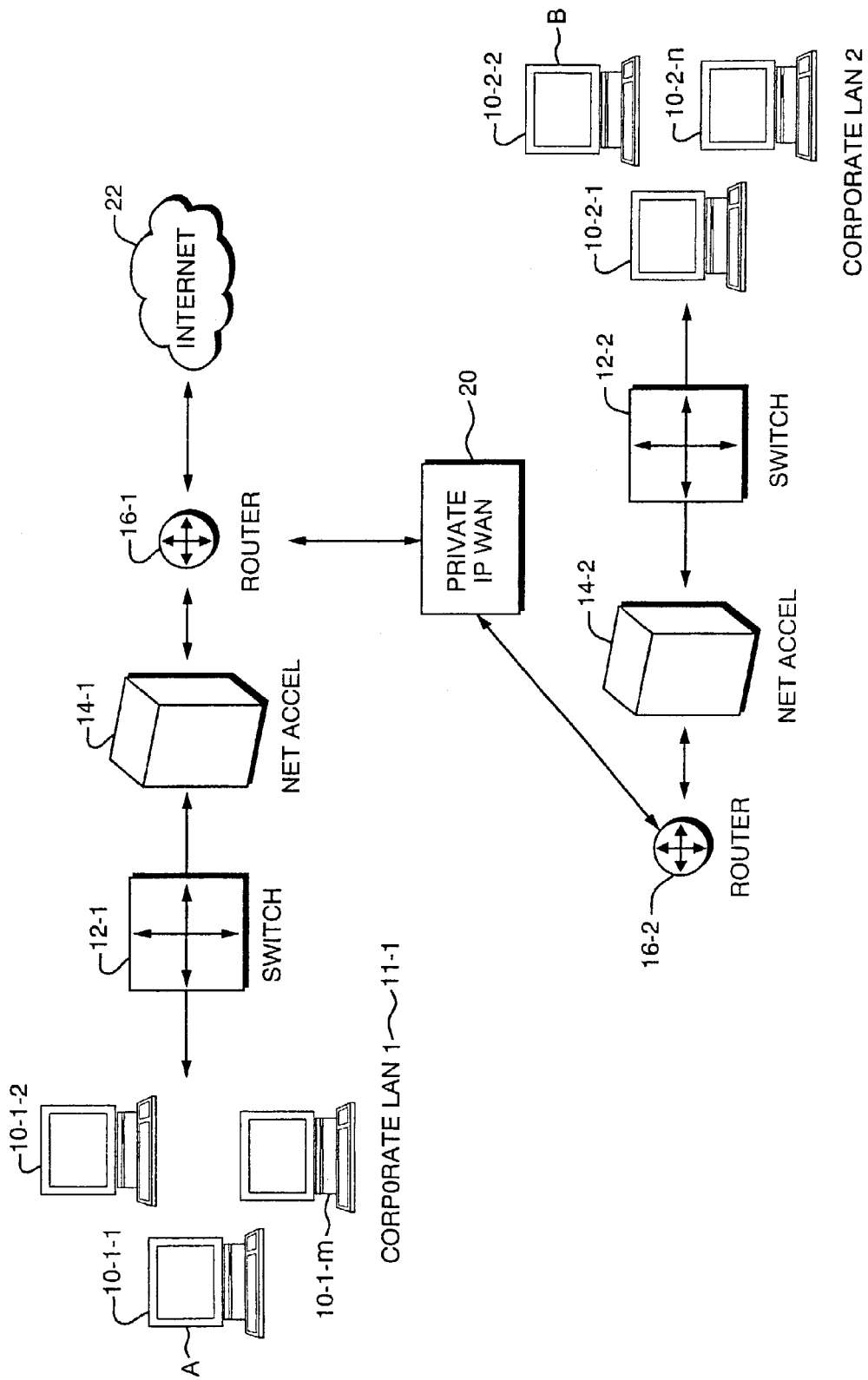
FIG. 1 is a high-level block diagram showing where network acceleration devices are implemented in a WAN network.
Figure 3:
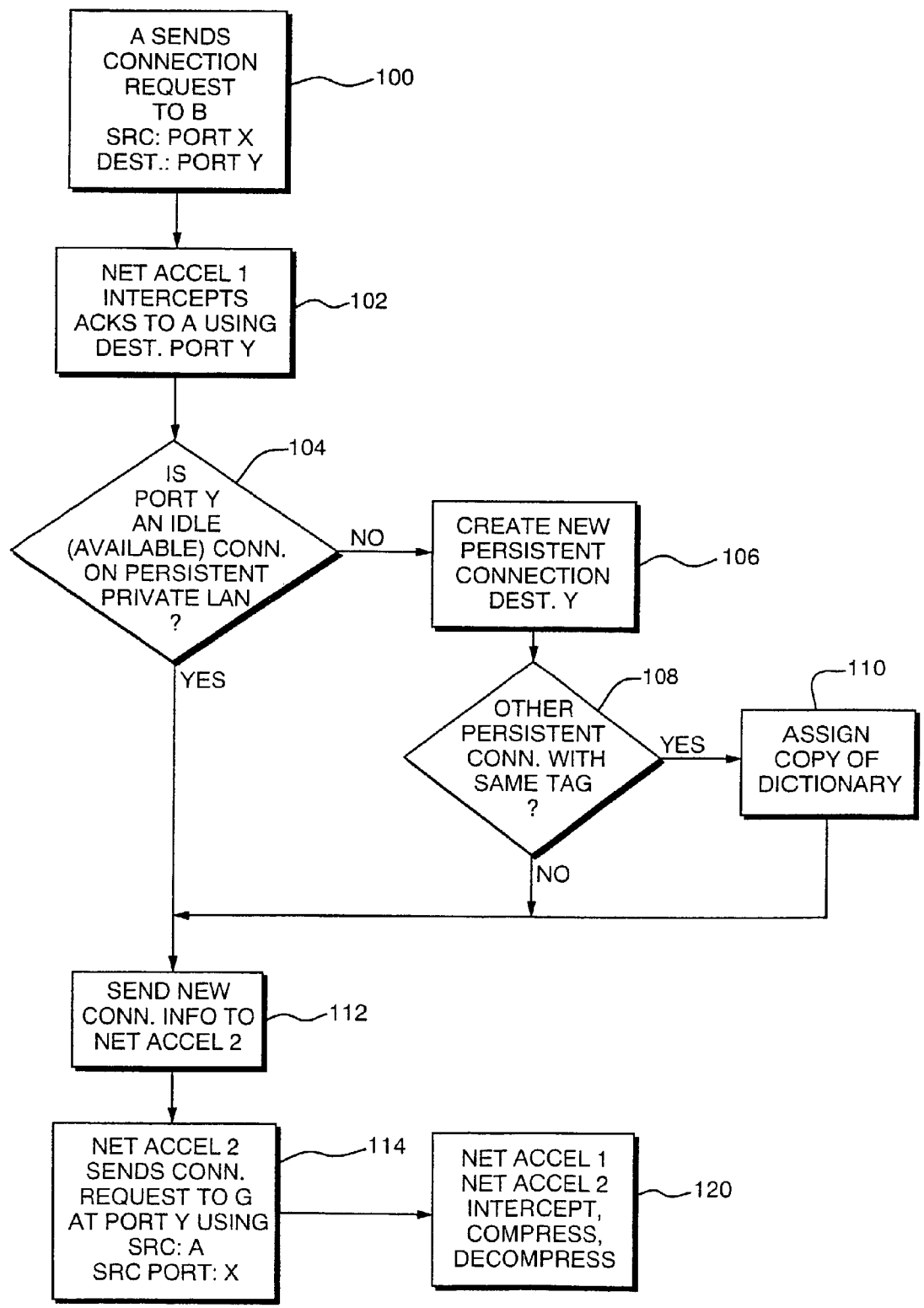
FIG. 3 is a flow diagram illustrating how LAN packets are processed.

Referring now to FIG. 3 as well as FIG. 1, consider that one of the clients 101-1 in the first LAN 11-1, known as Machine A, wishes to establish a connection with another client 10-2-2 in the second LAN 11-2, known as Machine B. The interaction of the main components of the system will now be described in detail. In a first step 100, a connection request packet is transmitted from Machine A. The connection requests that a connection be established between Machine A and Machine B. The connection request may, for example, specify port x for Machine A and port y for Machine B. At the TCP level, the connection request may take the form of a SYN message.

In the next step 102, the network accelerator 14-1 associated with the first LAN 11-1 is the first to intercept the connection request. It completes the connection request with Machine A by spoofing Machine B. For example, a response by network accelerator 14-1 is provided to Machine A using the destination address and port specified in the intercepted connection address, and replying to Machine A with a proxy acknowledgement in such a way as to fool Machine A into thinking it is connecting directly to Machine B when in fact it is not. This interception is performed by a proxy application running on the network accelerator as will be described in connection with FIG. 4.

The proxy application running on network accelerator 14-1 then assigns one of the persistent connections it has with the network accelerator 14-2 to handle the connection requested by Machine A. This can be done through the process beginning at state 104.

For example, a determination can first be made by network accelerator 14-1 if port y is reachable through an available persistent connection. If so, the existing connection with the second network accelerator 14-2 associated with the second LAN 11-2 will be discovered, and the connection request by Machine A will be associated with this existing persistent connection. If, however, no suitable persistent connection already exists, then a state 106 is entered in which a new persistent connection will be requested and established between network accelerators 14-1 and 14-2. This can be accomplished by passing connection request messages through the network that discover other compatible network accelerator 14.

In the next state 108, once the new persistent connection is established a determination is made whether or not a persistent connection has already been established for the same traffic type. If the answer is yes, then a copy of the existing compression dictionary for that persistent connection will be assigned to handle the new connection in state 110.

In any event, processing next continues to a state 112 where the new connection information is passed in a message between network accelerator 14-1 and network accelerator 14-2. The information defines the characteristics of the desired connection between Machine A and Machine B.

In state 114, network accelerator 14-2 finally receives a connection request. In response, it then sends its own connection request to Machine B on its local LAN 14-2. This connection request is established at port y using a source address for Machine A and source port x. Thus, network accelerator 2 also spoofs its connection to Machine B at its local end. With the end to end connection now set up through the proxies associated with network accelerators 14-1 and 14-2, LAN packets may now travel between Machine A and Machine B through the proxies provided by network accelerators 14-1 and 14-2. All packets related to established connections are intercepted by a network accelerator 14 and rerouted to a proxy application running on it. The proxy application compresses the rerouted data using a dictionary assigned to the persistent connection that the data belongs to. The compressed data is then sent to the remote network accelerator at the other end of the proxy connection. The proxy running on the remote network accelerator decompresses the received stream, and then sends it to the corresponding client using the source and destination address and ports that it has for this connection.

If the clients 10 are using Datagram Protocol (UDP), the traffic is handled in a slightly different way. Generally, it is desirable if UDP packets are intercepted and compressed as explained above. However, they are preferably retransmitted between the network accelerators via a suitable persistent TCP connection. Moreover, it is possible to parse some UDP-based protocols, such as RTSP, in order to obtain information that can facilitate compression.

Figure 4:
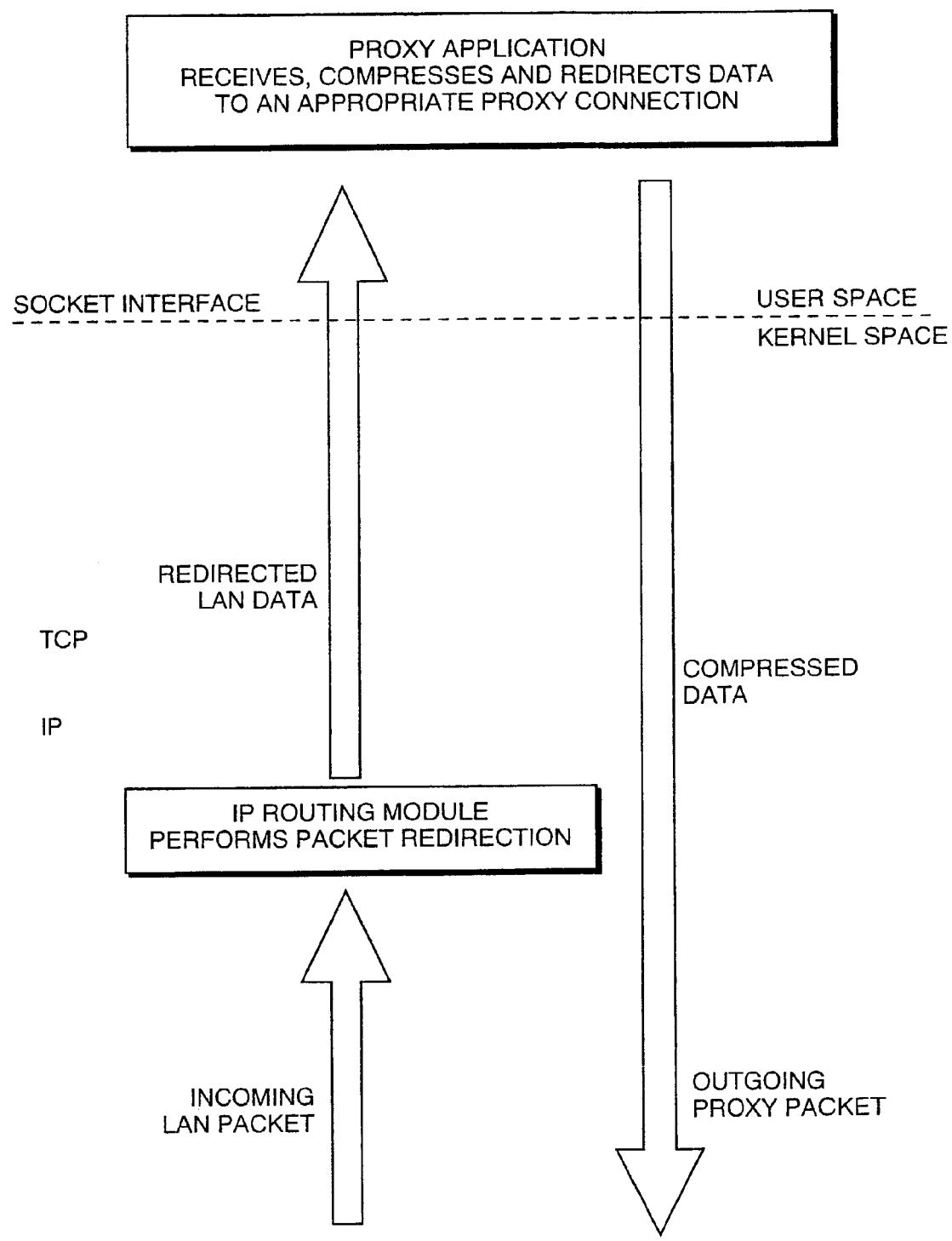
FIG. 4 is a software hierarchy illustrating where the proxy is located.

FIG. 4 is a high-level software diagram for implementation of the invention. An IP packet routing module within each network accelerator 14 performs packet redirection functions on incoming LAN packets. These are passed through IP and TCP layers, redirecting the packets to a proxy application 200. The proxy application 200 may access the rerouted data via standard socket API calls.

The proxy application then receives, compresses and redirects data to an appropriate proxy connection (as was described in connection with the steps 104 through 114 in FIG. 3.) On the receiver side, compressed data is fed out from the proxy application, back down through the protocol layers to provide the outgoing proxy packets.

The system therefore consists of at least two network accelerators 14-1 and 14-2 with one positioned at each end of a Wide Area Network (WAN) link. The WAN link provides available persistent connections between network accelerator machines 14.

In order for each remote network accelerator to be informed of the characteristics of the connection it is dealing, a proxy-to-proxy protocol is employed. Information transmitted via this proxy-to-proxy protocol includes at least the original transport protocol i.e., information as to whether or not the original protocol is TCP or UDP, original addresses and parts, start and end points for data and any possible error conditions.

In addition, packet "mangling" techniques are used so that all packets originating from a network-computing device to its local LAN are spoofed to reflect the characteristics of the original connection. Thus Machine A is at all times of the impression that it communicating directly with Machine B, and vise versa. The existence of the network accelerators 14-1 and 14-2 completely unknown to Machines A or Machines B. In addition, both A and B are not aware that compression algorithms are employed.

In the preferred embodiment, the compression scheme used is a variation of LZ77 and Huffman coding compression algorithms. The original LZ77 algorithm is described in a paper by Ziv J., et al., "A Universal Algorithm for Sequential Data Compression," IEEE Transactions on Information Theory, Vol. IT-23 (1979) pp. 337–343, although variants thereof can be used. The Huffman coding compression algorithm is described in "A Method for the Construction of Minimal Redundancy Codes," Proceedings of the IRE, Vol. 40, (1952), pp. 1098–1101, although again, variants can be used In a preferred embodiment, compression occurs as follow Data is first compressed using an LZ77 algorithm. This algorithm uses a persistent compression dictionary associated with a persistent connection assigned to transfer the data. In the next step, a Huffman coding algorithm is then applied to the results the first step. If the results of the previous steps exceed the size of the original data, then the original data is sent as is.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for handling packet traffic in a data network comprising the steps of:

routing outgoing packet traffic at a network layer to a proxy application running on a local network accelerator associated with a node which is a source of the packet traffic;

receiving, at the proxy application, intercepted packet traffic;

compressing data contained in the intercepted packet traffic via a dictionary based compression algorithm to produce compressed packet traffic, wherein compression occurs on data in the packet traffic that is expressed in at least at one of a fifth or a sixth layer above a transport layer (fourth layer) in the Open System Interconnection (OSI) model, and wherein inter-packet boundaries for the compressed data are determined at the transport layer; and transmitting compressed packet traffic to a remote network accelerator associated with a node which is a destination of the packet traffic via a persistent connection maintained with the remote network accelerator.

2. A method as in claim 1 wherein a proxy to proxy protocol is employed to specify at least an original transport protocol identifier, original address, and original ports of the nodes.

3. A method as in claim 1 wherein the dictionary based compression algorithm is an LZ77 algorithm.

4. A method as in claim 1 wherein a Huffman coding algorithm is applied to the data in the packets.

5. A method as in claim 1 wherein a dictionary associated with an existing end-to-end connection is utilized to service a new connection request.

6. A data network routing device comprising:
a router, connected to receive incoming packets at a network layer from a source node, the router examining the incoming packets to determine if they are addressed to a destination node which is not local to the router, and if so, routing them to a socket interface;
a proxy application, connected to receive incoming packets from the socket interface, the proxy application associated with the router, and the proxy application, acting as a proxy for the source node, also establishing a connection on behalf of the source node, the connection capable of carrying packets to the destination node; and
a data compressor, located within the proxy application, for compressing data contained in the packets prior to their transmission by the proxy application, wherein compression occurs on data in the packets that is expressed in at least one of a fifth or a sixth layer above a transport layer (fourth layer) in the Open System Interconnection (OSI) model, and wherein inter-packet boundaries for the compressed data are determined at the transport layer.

7. A device as in claim 6 additionally wherein the proxy application additionally receives packets from a network connection addressed to a destination node which is local to the router; and additionally comprising a data decompressor, for decompressing packets so received; and wherein the router also forwards decompressed packets to the destination node.

8. A device as in claim 6 wherein the network connection is a persistent connection established with another data network routing device having a proxy application.

9. A device as in claim 8 wherein a proxy to proxy protocol is used to pass original source node and distinction node information between the two proxy applications.

10. A device as in claim 8 wherein a proxy to proxy protocol specifies an original protocol type for the packets.

11. A device as in claim 6 wherein the connection is a Transmission Control Protocol (TCP) connection even if the source node and distinction node are using a different protocol.

12. A method for enabling communication between a source node and a destination node, comprising:
employing a first proxy node to forward a stream of packets between the source node and the destination node at the network layer, wherein the stream is expressed in at least one of a fifth and a sixth layer above a transport layer (fourth layer) in the Open System Interconnection (OSI) model, and wherein inter-packet boundaries for compressing the stream are determined at the transport layer;
employing a compression dictionary to compress the stream of packets for which the inter-packet boundries are determined for the compressed stream;
communicating the compressed stream to a second proxy node over a persistent connection associated with the stream between the source node and destination node;
employing the second proxy node to decompress the compressed stream; and
proxying the decompressed stream of packets to the destination node.

13. The method of claim 12, further comprising employing a proxy to proxy protocol to enable communication of the decompressed stream to the destination node, wherein the proxy to proxy protocol includes information regarding at least one of the persistent connection, an original transport protocol identifier, an original address of the source node, an original address of the destination node, an original port of the source node, or an original port of the destination node.

14. The method of claim 12, wherein employing the compression dictionary includes employing at least one of:
an LZ77 algorithm;
a Huffman coding algorithm;
a Huffman coding algorithm that is operative on a result of the LZ77 algorithm; or
an algorithm that utilizes a result of a Huffman coding algorithm that is applied to the result of the LZ77 algorithm.

15. The method of claim 12, wherein the compression dictionary employed for compression is one of a plurality of compression dictionaries, and wherein the one of the plurality of compression dictionaries is the same for the compressed stream that is communicated over the same type of persistent connection.

16. The method of claim 12, wherein the stream of packets from the source node employs at least one of a TCP or UDP protocol at the transportation layer.

17. The method of claim 12, wherein the decompressed stream provided to the destination node employs at least one of a TCP or UDP protocol at the transportation layer.

18. The method of claim 12, wherein proxying the decompressed stream to the destination node further comprises:
mangling the decompressed stream;
spoofing the decompressed stream; and
forwarding the decompressed stream to the destination node.

19. A system for enabling communication between a source node and a destination node, comprising:
a first network accelerator operative to perform the actions, including:
forwarding a stream of packets between the source node and the destination node at the network layer, wherein the stream is expressed in at least one of a fifth and a sixth layer above a transport layer (fourth layer) in the Open System Interconnection (OSI) model, and wherein inter-packet boundaries for compressing the stream are determined at the transport layer;
employing a compression dictionary to compress the stream of packets for which the inter-packet boundries are determined for the compressed stream;
communicating the compressed stream to a second network accelerator over a persistent connection associated with the stream between the source node and destination node; and a second network accelerator operative to perform actions, including:
  decompressing the compressed stream; and
  proxying the decompressed stream of packets to the destination node.

20. The system of claim 19, further comprising:
  a first network that is coupled to the source node and the first network accelerator; and
  a second network that is coupled to the destination node and the second network accelerator, wherein the first network and the second network are coupled to each other over a private wide area network.

21. The system of claim 19, further comprising a proxy to proxy protocol that enables communication of the decompressed stream to the destination node, wherein the proxy to proxy protocol includes information regarding at least one of the persistent connection, an original transport protocol identifier, an original address of the source node, an original address of the destination node, an original port of the source node, or an original port of the destination node.

22. The system of claim 19, wherein employing the compression dictionary includes employing at least one of:
  an LZ77 algorithm;
  a Huffman coding algorithm;
  a Huffman coding algorithm that is operative on a result of the LZ77 algorithm; or
  an algorithm that utilizes a result of a Huffman coding algorithm that is applied to the result of the LZ77 algorithm.

23. The system of claim 19, wherein the compression dictionary employed for compression is one of a plurality of compression dictionaries, and wherein the one of the plurality of compression dictionaries is the same for the compressed stream that is communicated over the same type of persistent connection.

24. The system of claim 19, wherein the stream of packets from the source node employs at least one of a TCP or UDP protocol at the transportation layer.

25. The system of claim 19, wherein the decompressed stream provided to the destination node employs at least one of a TCP or UDP protocol at the transportation layer.

26. The system of claim 19, wherein proxying the decompressed stream to the destination node further comprises:
  mangling the decompressed stream;
  spoofing the decompressed stream; and
  forwarding the decompressed stream to the destination node.

27. A network device for proxying network traffic comprising:
  a router that forwards a stream of packets between the source node and the destination node at the network layer, wherein the stream is expressed in at least one of a fifth and a sixth layer above a transport layer (fourth layer) of the Open System Interconnection (OSI) model, and wherein inter-packet boundaries for compressing the stream are determined at the transport layer;
  a compression dictionary is employed to compress the stream of packets for which the inter-packet boundries are determined for the compressed stream; and
  a proxy application for communicating the compressed stream to another network device over a persistent connection associated with the stream between the source node and destination node, wherein the other network device enables the decompression of the compressed stream, and proxying of the decompressed stream of packets to the destination node.

28. The network device of claim 27, wherein the proxy application enables a proxy to proxy protocol for communication of the decompressed stream to the destination node, wherein the proxy to proxy protocol includes information regarding at least one of the persistent connection, an original transport protocol identifier, an original address of the source node, an original address of the destination node, an original port of the source node, or an original port of the destination node.

29. The network device of claim 27, wherein the compression dictionary includes is operative to employ at least one of:
  an LZ77 algorithm;
  a Huffman coding algorithm;
  a Huffman coding algorithm that is operative on a result of the LZ77 algorithm; or
  an algorithm that utilizes a result of a Huffman coding algorithm that is applied to the result of the LZ77 algorithm.

30. The network device of claim 27, wherein the compression dictionary employed for compression is one of a plurality of compression dictionaries, and wherein the one of the plurality of compression dictionaries is the same for the compressed stream that is communicated over the same type of persistent connection.

31. The network device of claim 27, wherein the stream of packets from the source node employs at least one of a TCP or UDP protocol at the transportation layer.

32. The network device of claim 27, wherein the decompressed stream provided to the destination node employs at least one of a TCP or UDP protocol at the transportation layer.

* * * * *

UNITED STATES PATENT AND TRADEMARK OFFICE
CERTIFICATE OF CORRECTION

PATENT NO. : 7,126,955 B2 Page 1 of 1
APPLICATION NO. : 10/354438
DATED : October 24, 2006
INVENTOR(S) : Tarek Nabhan et al.

It is certified that error appears in the above-identified patent and that said Letters Patent is hereby corrected as shown below:

In the Specification:

First Page, Col. 2, (Other Publications), Line 4, Delete "Alorithm" and insert -- Algorithm --.

Column 4, Line 45, Delete "101-1" and insert -- 10-1-1 --.

Signed and Sealed this

Thirtieth Day of January, 2007

JON W. DUDAS
*Director of the United States Patent and Trademark Office*